United States Patent
Greco et al.

(10) Patent No.: US 6,512,086 B2
(45) Date of Patent: Jan. 28, 2003

(54) PROCESS FOR PREPARATION OF ORGANOSILICON COMPOSITIONS

(75) Inventors: Alberto Greco, Milan (IT); Antonio Ausilio, Milan (IT); Enrico Pozzi, Milan (IT)

(73) Assignee: Mapei S.p.A., Milan (IT)

( * ) Notice: Subject to any disclaimer, the term of this patent is extended or adjusted under 35 U.S.C. 154(b) by 3 days.

(21) Appl. No.: 09/910,957

(22) Filed: Jul. 24, 2001

(65) Prior Publication Data

US 2002/0058748 A1 May 16, 2002

(30) Foreign Application Priority Data

Jul. 25, 2000 (IT) .......................................... MI00A1695

(51) Int. Cl.⁷ .............................. C08J 3/00; C08G 77/60
(52) U.S. Cl. .......................... 528/480; 528/15; 528/25; 528/31; 528/44; 528/56; 528/58; 528/501
(58) Field of Search ................................ 528/31, 25, 44, 528/15, 56, 58, 480, 501

(56) References Cited

U.S. PATENT DOCUMENTS

| | | | |
|---|---|---|---|
| 3,408,321 A | | 10/1968 | Ashby |
| 3,700,715 A | * | 10/1972 | Berger ........................ 210/729 |
| 3,952,795 A | | 4/1976 | Clark |
| 3,971,751 A | | 7/1976 | Isayama et al. |
| 4,471,733 A | | 9/1984 | Tangorra et al. |
| 5,109,064 A | * | 4/1992 | Wakabayashi et al. ...... 525/100 |
| 5,298,572 A | | 3/1994 | Katz |
| 5,539,045 A | | 7/1996 | Potts et al. |
| 6,001,946 A | | 12/1999 | Waldman et al. |

FOREIGN PATENT DOCUMENTS

| | | |
|---|---|---|
| DE | 24 27 661 A1 | 1/1975 |
| DE | 40 29 504 A1 | 3/1992 |
| EP | 0 459 304 A2 | 12/1991 |
| EP | 0 496 109 A2 | 7/1992 |
| EP | 0 596 360 A1 | 10/1993 |
| EP | 0 676 403 A1 | 10/1995 |
| EP | 0 714 925 A2 | 6/1996 |
| EP | 0 714 953 A2 | 6/1996 |
| EP | 0 732 348 A1 | 9/1996 |
| WO | WO-93/05089 A1 | 3/1993 |

OTHER PUBLICATIONS

"Silane Modified Polybutadienes", Recent Advances in Adhesives, Proceedings of the American Chemical Society Symposia, meeting date 1971, pp 309–316, Lee (abstract).*
Plastics Manuf., vol. 91, 1979, pp. 40340, #91:40335y, "Purification of high–molecular weight polyalkylene glycol diethers", Fumio Kawakubo et al; JP 79/32597.
Patent Abstracts of Japan, JP Publ. No. 08–143660, Jun. 4, 1996, "Production of Hydrolyzable Silicon–Terminated Polymer and Composition Containing the Same", Doi Takao et al.
J. Org. Chem., 1998, 63, pp. 8515–8521, "Multilevel Selectivity in the Mild and High–Yielding Chlorosilane–Induced Cleavage of Carbamates to Isocyanates", Pek Y. Chong et al.

* cited by examiner

*Primary Examiner*—Robert Dawson
*Assistant Examiner*—Marc S. Zimmer
(74) *Attorney, Agent, or Firm*—Griffin & Szipl, P.C.

(57) ABSTRACT

Process for the preparation of fluid organosilicon compounds usable in adhesive, coating and sealant formulations is described. The process includes the synthesis of organosilicon prepolymer compositions starting from unsaturated polyurethanes obtained in turn from unsaturated monoalcohol polyethers and diisocyanates with a controlled NCO/OH ratio, to which chlorosilanes are added in the presence of methyl or ethyl orthoformates. These organosilicon compositions are able to cross-link through silicon-alkoxy end groups of the type:

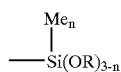

- n = 0, 1 and 2
- Me = —CH$_3$
- R = —CH$_3$, —C$_2$H$_5$.

18 Claims, No Drawings

PROCESS FOR PREPARATION OF ORGANOSILICON COMPOSITIONS

This invention relates to a process for the preparation of fluid organosilicon compositions which can be used in adhesive, coating and sealant formulations. This process, which involves two consecutive steps conducted in the same reactors, as described below, provides prepolymers able to cross-link under normal moisture and room temperature conditions, forming elastomers as a result of hydrolysis of the silicon-alkoxy groups at the chain ends and subsequent condensation of the silanols generated by the hydrolysis process. The organosilicon compositions obtained with this process have low viscosity and are particularly suitable for the formulation of single-component moisture-curing adhesives and sealants.

STATE OF THE ART

Polyethers able to cross-link through silicon-alkoxy groups at the chain ends are described in U.S. Pat. No. 3,971,751 and DE 2.427.661; the products claimed in those patents are obtained by adding chlorosilanes to prepolymers containing allyl ether groups at the chain end; in the organosilicons thus obtained, the silicon-chlorine bond is transformed into a silicon-alkoxy bond by reaction with methyl alcohol in the presence of a hydrochloric acid acceptor such as a cyclic ether.

The critical point of this synthesis process is the synthesis of the unsaturated prepolymer suitable for addition of chlorosilane; for this purpose, a polyether glycol in the form of sodium or potassium alcoholate is chain-extended by coupling with methylene chloride and functionalised at the chain end by reaction with allyl chloride. The synthesis is somewhat delicate as regards the chain extension, and involves the drawback that it produces alkaline chlorides, from which the prepolymer must be freed by complex processes, as taught, for example, by JP 7932597; in addition, the reaction that leads to the chain extension is non-selective, with consequent broadening of the molecular weight distribution to the detriment of the rheological characteristics of the prepolymers.

In U.S. Pat. No. 5,298,572, polyethers able to cross-link by means of silicon-alkoxy groups at the chain ends are obtained from polyether prepolymers with isocyanate and allyl alcohol endings; the resulting unsaturated polyurethane structure prepolymers are converted to prepolymers with silicon-alkoxy functionality by addition of alkoxysilanes.

The addition of alkoxysilanes to unsaturated polyurethane prepolymers instead of chlorosilanes, which would be preferred for reasons of cost, is necessitated by the fact that the latter attacks the amide bond; another drawback is due to the synthesis of prepolymers with isocyanate endings effected by coupling glycol polyethers with diisocyanates, as that reaction is non-selective and involves broadening of the molecular weight distribution which, together with the presence of a multiplicity of carbamate groups in the polymer structures, contributes to worsening the rheological characteristics of the organosilicon prepolymer.

The synthesis process described in JP 08143660 partly alleviates some of the drawbacks associated with the previous synthesis; according to this patent, glycol polyethers are initially converted to terminally unsaturated polyethers by reaction with allyl isocyanate, and then converted to organosilicons by addition of alkoxysilanes.

With this synthesis, the viscosity of the organosilicon prepolymers is improved by eliminating the chain extension and reducing the concentration of carbamate groups in the prepolymers, but requires alkoxysilanes as silylation reagents of the unsaturated polyurethane prepolymers.

A synthesis route proposed in a large number of patents which does not involve the use of chlorosilanes or alkoxysilanes, and which apparently simplifies the preparation of organosilicons, is based on the addition of an organosilicon coupling agent to a polyether-polyurethane prepolymer with isocyanate groups at the chain ends; this coupling agent is a chemical reagent which presents an organic group containing at least one active hydrogen atom according to Zerewitinoff at one end and a silicon-alkoxy reactive group at the other end of its molecule.

This synthesis route, indicated by way of example in patents U.S. Pat. Nos. 3,952,795 and 3,408,321, EP 732348 and 0459304, and DE 4029504, uses a coupling agent in which the group with active hydrogen according to Zerewitinoff is constituted by an alcoholic hydroxyl, a thiol or preferably a primary amine group, which allows easy quantitative addition to the isocyanate group, giving rise to a ureic group.

Despite the simplicity of synthesis, the organosilicons thus obtained present high viscosity due to the large number of polyurethane groups introduced into the polymer structures and the presence of strongly polar urea groups when alkylene aminoalkoxysilanes are used as coupling agents; it should also be borne in mind that organosilicon coupling agents are in turn obtained by addition of chlorosilanes or alkoxysilanes to olefins, with the result that they still represent an additional cost which must be taken into account.

A synthesis route which leads to organosilicon prepolymers containing urethane groups in their structure without using isocyanates is described in EP 714925 and 714953.

According to this synthesis, a diol polyether is functionalised at the chain end with the acyloyl chloride function by reacting the diol polyether with a dicarboxylic acid dichloride; the reaction with an aminoalkyl alkoxysilane of the polyether thus functionalised allows two silicon-alkoxy groups to be attached to the chain end of the prepolymer via amide bridges.

This process presents problems due to the fact that in the reaction between polyether glycol and diacyloyl chloride, hydrochloric acid is produced which needs to be removed; an increase in the polydispersity of the prepolymer cannot be ruled out since the polyether/diacyloyl chloride coupling reaction is non-selective; and finally, more or less high proportions of hydrolytically unstable ester structures are introduced into the polymer structure.

Some of the drawbacks involved in the use of aminoalkyl alkoxysilane coupling agents can be alleviated by using aminoalkyl alkoxysilanes with a secondary amine group, as described in U.S. Pat. No. 5,539,045 and EP 0676403 or in DE 0596360 and U.S. Pat. No. 6,001,946; an N-phenyl-γ-aminopropyl triethoxysilane is used as coupling agent in the first two patents, and organosilicon coupling agents containing aspartate groups in the others.

These solutions present some advantages compared with those offered by the previous aminoalkyl alkoxysilanes, because they reduce the ureic NH groups and make the organosilicon polymers more flexible after cross-linking; however, they do not eliminate the chain extension of the polyether during its functionalisation with the isocyanate group or the drawback of using more sophisticated, expensive coupling agents than the previous ones; in the particular case in which the use of a coupling agent with an aspartate structure is required, hydrolytically unstable ester groups are introduced into the polymer structures in a position adjacent to the silicon-alkoxy group, which may adversely affect adhesion in the case of calcareous or cementitious substrates.

A particular case of a coupling agent is represented by γ-isocyanate propyl trialkoxysilane which is claimed, for example, in WO 9305089 and JP 08143660; organosilicon prepolymers with only two urethane groups per polymer chain and a narrow molecular weight distribution can be prepared with this coupling agent directly from polyether glycols; however, the coupling agent is not easily accessible, requiring silylation of the allyl isocyanate with alkoxysilanes; in addition, the use of this coupling agent does not eliminate the drawback, common to all the others, of introducing urethane polar groups in the immediate vicinity of the reactive silicon-alkoxy group of the organosilicon prepolymer, which makes the wettability of the fillers in the formulations more problematic than that of prepolymers with a different structure such as those claimed in U.S. Pat. No. 3,971,751, especially in the case of calcium carbonate.

Many of these difficulties are solved by EP 0496109, in which organosilicon prepolymers are obtained by coupling polyether alcohols with an olefin group at the chain ends with diisocyanates; alkoxysilanes are then added to the unsaturated linear prepolymers with a polyether-polyurethane structure to give organosilicon prepolymers with silicon-alkoxy groups at the chain end.

The synthesis requires polyethers with a sufficiently high molecular weight and uses pure alkoxysilanes instead of the cheaper chlorosilanes, which should be the preferred silylation agents since they are obtained from them, for example, by the alcoholysis process described in U.S. Pat. No. 4,471,733.

The choice of alkoxysilanes as silylation agents of unsaturated prepolymers is mandatory when urethane groups are present in the structure, in that chlorosilanes attack the amide NH groups, generating hydrochloric acid, which destroys the silicon-hydrogen bond and disproportions the silanes (J. Org. Chem. 1998, 63, 8515 and ref.).

It is therefore desirable to have a process for the preparation of organosilicon prepolymers with a reactive silicon-alkoxy end group which:

1. uses the relatively simple chemistry of the isocyanates to obtain terminally unsaturated prepolymers with a polyether-polyurethane structure;
2. produces unsaturated prepolymers with a controlled degree of branching and minimal content in urethane groups, so as to exhibit the ideal rheological behaviour;
3. allows the use of chlorosilanes rather the alkoxysilanes to convert unsaturated prepolymers to reactive organosilicons;
4. does not require complex synthesis or purification processes and therefore allows organosilicon compounds with silicon-alkoxy end groups to be obtained in a single reactor.

DESCRIPTION OF INVENTION

The objects set out above are achieved by the process in accordance with the invention, which involves the synthesis of organosilicon prepolymer compositions starting from unsaturated polyurethanes obtained in turn from unsaturated monoalcohol polyethers and diisocyanates with a controlled NCO/OH ratio, to which chlorosilanes are added in the presence of methyl or ethyl orthoformates. These organo silicon compositions are able to cross-link through silicon-alkoxy end groups of the type:

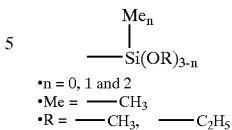

• n = 0, 1 and 2
• Me = ——CH$_3$
• R = ——CH$_3$,  ——C$_2$H$_5$

In particular, the object of the invention is a process for the preparation of organosilicon compositions consisting of prepolymer A or the mixture of prepolymers A+B, the content of B being between 0 and 30% by weight of the mixture, wherein said prepolymers have the following structural formulas:

(A)

(B)

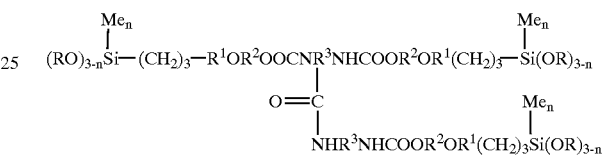

wherein:

R is methyl or ethyl;

$R^1$ is absent or is an organic hydrocarbon, aliphatic, cycloaliphatic, aromatic or ether radical containing 1 to 18 carbon atoms;

$R^2$ is a divalent organic radical deriving from a polyether glycol, preferably constituted by a polypropylene oxide or a propylene oxide and ethylene oxide copolymer of the statistical and/or block type, in which the polyethylene oxide fraction does not exceed 20% by weight; $R^2$ is also characterised by a molecular weight of between 2,000 and 20,000 Daltons;

$R^3$ is a divalent hydrocarbon, aliphatic, cycloaliphatic or aromatic radical containing 4 to 36 carbon atoms;

n =0,1 and 2

The said process comprises the following two steps, which are carried out in a single reactor:

a) synthesis of unsaturated prepolymer $A^1$, or of the mixture of unsaturated prepolymers $A^1+B^1$, where the content of $B^1$ is between 0 and 30% by weight of the mixture, ($A^1$)

($B^1$)

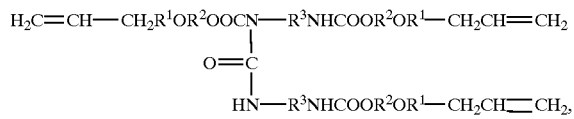

where R, $R^1$, $R^2$ and $R^3$ are as defined above, and b) conversion of $A^1$ or $A^1+B^1$ to A and A+B respectively by silylation catalysed with alkoxysilanes generated in situ by reaction between chlorosilanes with structure C

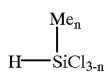

(C)

and orthoformates with structure D $$HC(OR)_3 \quad (D)$$

where n and R are as defined above.

Prepolymers with the structure $A^1$ or an $A^1+B^1$ mixture are in turn prepared from unsaturated polyether monoalcohols with structure (E), where $R^1$ and $R^2$ have the meanings defined above

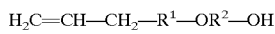

(E)

and diisocyanates (F), in which $R^3$ has the meaning defined above $$OCN-R^3-NCO \quad (F)$$

E is coupled to F in the ratio NCO/OH $\geq$ 1.0 and $\leq$ 1.25; all compositions of $A^1$ and $B^1$ can be covered in this interval of the NCO/OH ratio, with $A^1$ ranging between 100% and 70% (by weight) and $B^1$ ranging between 0 and 30% (by weight).

As synthesis of the unsaturated prepolymers $A^1$ or an $A^1+B^1$ mixture and their conversion to prepolymers with silicon-alkoxy functionality A or an A+B mixture by reaction with chlorosilanes C in the presence of orthoformates D can be performed in the same reactor, the process described herein can be called "one-pot two-steps".

This process presents the following advantages:

In the synthesis of $A^1$ or an $A^1+B^1$ mixture, the degree of branching of the prepolymers can be controlled.

For conversion of prepolymers $A^1$ or an $A^1+B^1$ mixture, it is not necessary to use directly alkoxysilanes G

(G)

but rather the chlorosilanes which are the first products of synthesis of silicones through the Rochow process.

As the reaction between chlorosilanes C and orthoformates D only generates a gaseous product, namely methyl chloride or ethyl chloride, and any unreacted products such as methyl or ethyl orthoformate are low-boiling, there is no need for complex purification processes because it is sufficient to ventilate the products with an inert gas or simply apply a vacuum.

Surprisingly, the reaction between chlorosilanes and orthoformates which leads to alkoxysilanes proceeds in the mass of unsaturated prepolymers $A^1$ or an $A^1+B^1$ mixture with a high level of efficiency, so that even with chlorosilane/double bond ratios close to the stoichiometric ratio, these prepolymers can be converted to organosilicon prepolymers A or an A+B mixture; in fact, unsaturated prepolymers $A^1$ or an $A^1+B^1$ mixture act like reactive diluents, and do not allow losses of alkoxysilane by entrainment of the gaseous component that develops during the reaction (methyl chloride), whereas this does happen when the reaction between orthoformate (D) and chlorosilane (C) is carried out separately.

The process provides products with a narrow MW distribution and minimal contribution of amide NH in the structure, supplying fluid compositions based on reactive prepolymers with structure A or an A+B mixture which have particularly low viscosities and therefore the most desirable characteristics for their use in the formulations of single-component moisture-curing adhesives or sealants.

The controlled degree of branching of the polymer chains and the functionality of the silicon-alkoxy group at the chain ends are such that products based on prepolymers prepared with the process of the invention exhibit a wide range of properties, ranging from highly elastic to rigid products in accordance with the use for which they are designed, in particular in single-component moisture-curing adhesive and sealant formulations:

DETAILED DISCLOSURE OF THE INVENTION

Preparation of Terminally Unsaturated Prepolymers: Structure $A^1$ or Mixed $A^1$ and $B^1$.

Prepolymers A or an $A^1+B^1$ mixture are obtained from unsaturated monoalcohols (E) by reaction with diisocyanate (F) in an NCO/OH ratio ranging between 1.0 and 1.25, depending on whether a linear structure ($A^1$) or mixed linear and branched structures (an $A^1+B^1$ mixture) is to be obtained, up to a maximum limit of 30% by weight of $B^1$ in the mixture. The reaction is conducted at temperatures between +60 and +150° C., and preferably between +80 and +125° C.

Although the reaction can be carried out by the effect of temperature alone, in order to accelerate it or make the allophanatisation process more selective it is preferable to use one or more catalysts selected from the classes of tertiary amines, morpholines, cycloamidines or organometallic compounds of the elements included between the first and eighth groups.

Organometallic compounds are preferred, especially tin compounds such as tin octoate, tin dibutyl dilaurate, tin dibutyl oxalate, acetyl acetonate, maleate and others, zinc compounds such as zinc octoate, zirconium and titanium compounds such as alkoxides or acetyl acetonates, organic compounds of bismuth, organic compounds of mercury and lead;

organometallic compounds of tin or zinc are preferably used, possibly combined.

The concentration of the catalysts is usually between $1 \times 10^{-3}$ and $500 \times 10^{-3}$ g/kg of the reaction mixture, and preferably between $5 \times 10^{-3}$ and $100 \times 10^{-3}$ g/kg.

The reaction is usually carried out at a temperature and catalyst concentration suitable to be completed in 4–20 hours; completion of the reaction can be monitored by IR spectroscopy (disappearance of carbonyl band of the isocyanate) or chemical analysis of the isocyanate groups.

Small proportions of solvents and/or plasticisers may be added during the reaction to reduce viscosity and control the temperature, but it is preferable to operate in mass.

For the synthesis of prepolymers, as a general procedure unsaturated monoalcohol E, diisocyanate F and the catalyst at a temperature between room temperature and +60° C. are loaded into the reactor. The temperature is then increased to the value needed to complete the reaction in the times required, preferably between 2 and 10 hours.

Unsaturated monoalcohols with structure E, which have a molecular weight between 2000 and 20,000, preferably between 2000 and 10,000, obtained by catalytic grafting of propylene oxide or a mixture of propylene oxide and ethylene oxide onto organic compounds with a primary or secondary alcohol group and an allyl or ethenyl group, are suitable for the synthesis of unsaturated prepolymers.

Typical unsaturated alcohols suitable for grafting are allyl alcohol, allyl alcohol propoxylated or ethoxylated, 7-octene-1-ol, undecenyl alcohol, monoallylether ethoxylate hydroquinone and monoethoxylate allyl phenol. As mentioned above, $R^1$ may be represented by one of the following organic radicals:

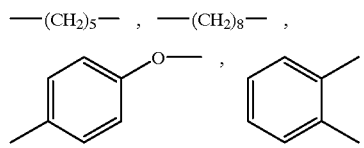

while $R^2$ may be generally represented by the organic diradical with polyether structure

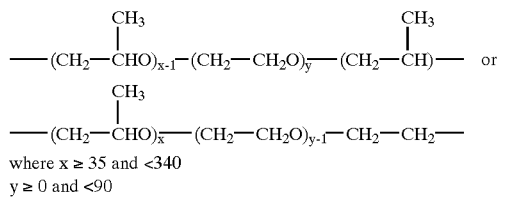

where $x \geq 35$ and $< 340$
$y \geq 0$ and $< 90$

Typical graft catalysts of unsaturated alcohols are strong inorganic bases such as KOH and CsOH or complex cyanides of two metals such as cyanocobaltates, phosphazenium hydroxides or aluminium porphinates.

The preferred catalysts include zinc cyanocobaltates or phosphazenium salts, which can produce unsaturated monoalcohols with a narrow molecular weight distribution and molecular weights of the preferred size, e.g. between 2,000 and 10,000 Daltons.

The diisocyanates may be the aliphatic, cycloaliphatic or aromatic type, and contain 4 to 36 carbon atoms.

All of them originate from the reaction of phosgene with the corresponding diamines, although in some cases different synthesis methods may be used such as the addition of "isocyanic acid" to diisopropenyl benzene or pyrolysis of aryl or alkyl carbamates; the latter include hexamethylene diisocyanate, isophorone diisocyanate, trimethylhexylene diisocyanate, norbornenyl diisocyanate, xylylene diisocyanate, cyclohexyl diisocyanate, dimeryl diisocyanate, dicyclohexyl methylene diisocyanate, tetramethyl xylylene diisocyanate, toluene diisocyanate, diphenyl methane diisocyanate and naphthylene diisocyanate. In agreement with the details set out above, $R^3$ may be represented by one of the following divalent organic radicals:

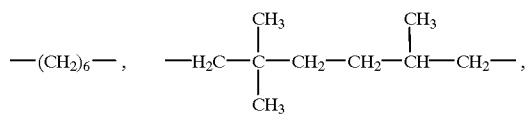

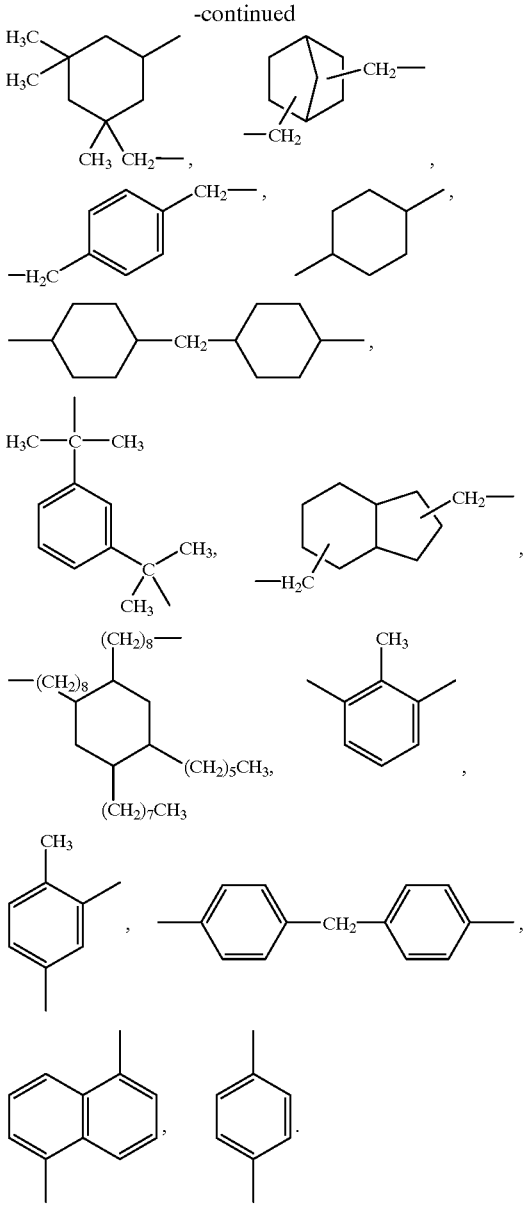

The preferred diisocyanates are hexamethylene diisocyanate, xylylene diisocyanate and isophorone diisocyanate in the aliphatic isocyanate class, and 2,4 and 2,6 toluene diisocyanate and diphenyl methane diisocyanate in the class of aromatic diisocyanates.

Preparation of Polymers with Silicon-alkoxy End Groups: Structure A or A+B Mixture Unsaturated prepolymers with structure $A^1$ or an $A^1+B^1$ mixture are converted to organosilicon prepolymers with reactive silicon-alkoxy function at the chain end of the type

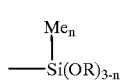

by reaction with chlorosilanes (C) in the presence of orthoformates (D) in accordance with the following stoichiometric ratios: orthoformate/chlorosilane ($r^2$) and chorosilane/double bond present in the structure of the unsaturated prepolymer ($r^1$):

$$r^2 = \frac{Me_n}{(3-n)HC(OR)_3/HSiCl_{3-n}} \quad \geq (3-n), \leq 1.2(3-n)$$

$$r^1 = \frac{Me_n}{HSiCl_{3-n}/\text{double bond}} \quad >1, \leq 10$$

where $r^1$ indicates that more than one mole of chlorosilane is needed for each double bond present in the structure of the unsaturated prepolymer; $r^2$ is preferably between (3−n) and 1.03(3−n) and $r^1$ between 1.1 and 2.5.

According to the process, orthoformate C is added first to unsaturated prepolymers $A^1$, or an $A^1+B^1$ mixture; chlorosilane is then added under temperature control. As the reaction is exothermic, control of the temperature, which should be maintained in the interval between −15 and +40° C., requires external cooling and gradual addition of chlorosilane. The addition of chlorosilane is preferably adjusted so as to maintain the temperature between +18 and +25° C.

The catalyst is added immediately after the addition of chlorosilane; the catalyst is constituted by an inorganic salt or organometallic complex of the platinum group, with a valency between 0 and +4, or rhodium with a valency between 0 and +3.

The catalyst is preferably an inorganic or organic platinum compound, particularly hexachloroplatinic acid in isopropanol solution (Speyer catalyst). The catalyst concentration is between $0.1 \times 10^{-3}$ and $10 \times 10^{-3}$ g/kg of prepolymer to be silylated, and preferably between $1 \times 10^{-3}$ and $5 \times 10^{-3}$ g/kg.

After addition of the catalyst the temperature of the reaction mixture, consisting of prepolymers, orthoformates and silanes, is gradually increased to the reflux temperature; the reactor is surmounted by an efficient water-cooled condenser (15–20° C.) for this purpose. During this stage gaseous products develop, namely methyl chloride in the case of methyl orthoformate and ethyl chloride in the case of ethyl formate, and low-boiling methyl or ethyl formates, are formed.

The silylation of unsaturated prepolymers is conducted by reflux at temperatures ranging between +70 and +125° C., preferably between +80 and +105° C.; the time taken for silylation is between 4 and 20 hours, preferably between 8 and 12 hours. The progress of the reaction is monitored by IR spectroscopy by establishing the disappearance or substantial reduction of the silicon-hydrogen bond, or chemically, by analysing the double bond by the iodometric (Hanus) method.

When the reaction is finished, the by-products (formic esters and methyl or ethyl chlorides) and unreacted products (such as alkoxysilanes and orthoformates) are easily eliminated by ventilating the product while hot with inert gas such as dry nitrogen, or by applying a vacuum.

The chlorosilanes C suitable for silylation of unsaturated prepolymers are obtained as by-products in the synthesis of dimethyl dichlorosilane from metallic silicon and methyl chloride, and have the following structures:

$HSiCl_3$, $HSiMeCl_2$, $HSiMe_2Cl$ of these, the preferred compounds are $HSiMeCl_2$ and $HSiMe_2Cl$ especially $HSiMeCl_2$.

Orthoformates are obtained from chloroform and sodium methoxide or ethoxide; methyl or ethyl orthoformate is preferred for synthesis, especially methyl formate:

$HC(OCH_3)_3$

When conducted appropriately, the synthesis process produces liquid prepolymers with structure A or an A+B mixture, which have low viscosity, typically <500,000 mPa.sec at +25° C., preferably in the range between 5,000 and 50,000 mPa.sec at +23° C., able to cross-link rapidly under room temperature and humidity conditions as a result of condensation of the silanol groups which originate from hydrolysis of the silicon-alkoxy groups; they are consequently particularly useful in formulations of single-component moisture-curing adhesives and sealants.

The following examples illustrate the process of the invention and the properties of the products thus obtained in more detail.

EXAMPLE 1

Preparation of Organosilicon Prepolymer with Silicon Methyl Dimethoxy End Group

Preparation of Unsaturated Prepolymer

An unsaturated monoalcohol polyether with skeleton consisting of propylene oxide with N° OH (mg KOH/g) 15.8 (g 140, meq OH 39.43), 2.4 toluene diisocyanate, (g 3.6, meq NCO 41.38) and tin butyl dilaurate (mg 2.8, 20 ppm) are loaded in that order into a four-necked 250 ml flask fitted with mechanical blade agitator, cooler supplied with tapwater, dropping funnel and thermometer, in dry nitrogen, at room temperature.

The contents of the flask are heated in one hour to 105° C. using an oil bath and kept under constant stirring at that temperature until total disappearance under IR of the carbonyl band corresponding to the isocyanate (2240 cm$^{-1}$), which takes 5–6 hours.

Gel permeation chromatography (SEC) analysis evidences that the polymer mainly consists of a product with a linear urethane structure (96%) and a smaller proportion (4%) of a product with a branched structure containing urethane and allophanate groups, the former having a molecular weight of 7000 and the second having a molecular weight of 10,000.

Conversion of Unsaturated Prepolymer to Organosilicon with Methyl Dimethoxysilane Generated In Situ Methyl orthoformate (g 17.6, mmol 165.8) is added to the unsaturated prepolymer prepared as described above (g 139, double bond meq 39.1) at room temperature in the same reactor as described above. The reagents are heated to +15/+18° C. under stirring, and when they have been homogenised, methyl dichlorosilane (g 9.3, mmol 80.8) is added through the dropping funnel; as the reaction is exothermic, the addition is performed in one to two minutes under heat control so that the temperature of +25° C. is not exceeded.

At the end of the chlorosilane addition, hexachloroplatinic acid is immediately added to the reagents in the form of a solution (1% by weight) in isopropanol (mg 0.56 as metallic platinum, 4 ppm).

The reagents are then heated with the external bath at the reflux temperature of 70–80° C. in two hours. Gas (mainly methyl chloride) is produced during this period, and the mixture of reagents changes from an acid to a neutral reaction; this can be demonstrated by testing with a phenol-phthalein indicator, the colour of which changes from greenish yellow to pale straw yellow.

After two hours the development of gas has completely ceased, the reflux declines, and the reaction temperature can be increased to +90° C. It is maintained at this level until completion of silylation, which is monitored by complete disappearance under infrared of the Si—H band (2140 cm$^{-1}$): this takes 6–8 hours.

After the disappearance of the Si—H bond the reaction continues at +100° C. for 1–2 hours. The product is then cooled to +60/+80° C., and the unreacted products and by-products of the reaction, now only present in traces, are removed by applying a vacuum.

The silylated prepolymer has a straw yellow colour and a viscosity of 6000 mPasec at +23° C.

An elementary formulation of this prepolymer is constituted as follows:

| | |
|---|---|
| organosilicon prepolymer | pp 98.5 |
| K-740 (catalyst) (ACIMA) | pp 0.5 |
| DAMO.T (organosilicon coupling agent) (SIVENTO) | pp 1.0 | cross-links rapidly on exposure to room temperature and humidity, producing an elastomer that presents (0.5 mm thickness) the following traction characteristics after 7 days at +23° C., 50% RH.:

| | |
|---|---|
| ultimate tensile strength (N/mm$^2$) | 0.41 |
| elongation corresponding to ultimate tensile strength (%) | 240 |
| 100% modulus of elongation (N/mm$^2$) | 0.32 |

EXAMPLE 2

Preparation of Organosilicon Prepolymer with Silicon Methyl Diethoxy End Groups

An unsaturated prepolymer with a urethane structure was prepared under the same conditions as described in example 1.

Triethyl orthoformate (g 20.8m mmol 141) was added to this prepolymer (g 140, double bonds meq 39.2) at the temperature of +18/+20° C.

After homogenisation under stirring, methyl dichlorosilane (g 7.9, mmol 68.6) is added through the dropping funnel, ensuring that the temperature of 23° C. is not exceeded.

Immediately after the addition, hexachloroplatinic acid is added in the same proportion as used in example 1, and preparation is continued under the same conditions, times and temperatures as described in example 1.

After removing the unreacted silanes and by-products with a vacuum at the end of silylation, the prepolymer, which has a viscosity of 6500 mPas at +25° C. in an elementary formulation identical to the one described in example 1, is able to produce a film with a skin time of approx. 24 hours, which exhibits the following mechanical characteristics after a week (+23° C., 50% R/H):

| | |
|---|---|
| ultimate tensile strength (N/mm2) | 0.38 |
| elongation corresponding to ultimate tensile strength (%) | 280 |
| 100% modulus of elongation (N/mm2) | 0.29 |

EXAMPLE 3

Comparison

Attempt to prepare organosilicon prepolymer with silicon methyl dimethoxy end group, methyl dimethoxysilane being prepared separately.

Trimethyl orthoformate (g 17.6, mmol 166.0) is loaded into the same reactor as described in example 1, and methyl dichlorosilane (g 9.3, mmol 80.8) is fed through the dropping funnel under stirring at the temperature of +18–23° C. in 2–3 minutes. Stirring is continued at +35/38° C. until a neutral reaction and complete cessation of gas development are obtained (approx. 1 hour).

After cooling to room temperature the unsaturated prepolymer described in example 1 (g 136, double bonds meq 38.2) is added. After homogenisation, hexachloroplatinic acid solution in the same proportion as indicated in example 2 is added. Preparation then continues at the same times and temperatures and under the same silylation conditions as described in example 2. After elimination of the by-products and unreacted silanes with a vacuum, an elementary formulation of the prepolymer thus obtained in accordance with the recipe indicated in example 1 is unable to cross-link, even after lengthy exposure to environmental humidity.

What is claimed is:

1. A process for the preparation of organosilicon compositions consisting of prepolymer A or a mixture of prepolymers A+B, the content of B being between 0 and 30% by weight of the mixtures, in which said prepolymers have the following structural formula:

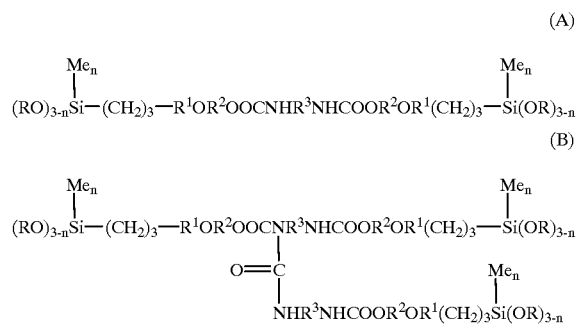

wherein:

R is methyl or ethyl;

R$^1$ is absent or is an organic hydrocarbon, aliphatic, cycloaliphatic, aromatic or ether radical containing 1 to 18 carbon atoms;

R$^2$ is a divalent organic radical with a molecular weight of between 2,000 and 20,000 Daltons deriving from a polyether glycol, preferably constituted by a polypropylene oxide or a propylene oxide and ethylene oxide copolymer of the statistical and/or block type, in which the polyethylene oxide fraction does not exceed 20% by weight;

R$^3$ is a divalent hydrocarbon, aliphatic, cycloaliphatic or aromatic radical containing 4 to 36 carbon atoms;

n=0, 1 and 2;
said process comprising the following steps, which are carried out in a single reactor:
a) synthesis of unsaturated prepolymer $A^1$, or of the mixture of unsaturated prepolymers $A^1+B^1$, where the content of $B^1$ is between 0 and 30% by weight of the mixture $$H_2C=HC-CH_2-R^1OR^2OOCNHR^3NHCOOR^2OR^1-CH_2-CH=CH_2 \quad (A^1)$$

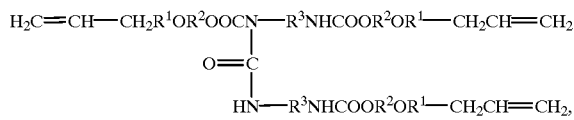
(B¹)

where R, $R^1$, $R^2$ and $R^3$ are as defined above, and
b) conversion of $A^1$ or $A^1+B^1$ to A and A+B respectively by silylation with alkoxysilanes generated in situ by reaction between chlorosilanes with structure C

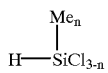
(C)

and orthoformates with structure D $$HC(OR)_3 \quad (D)$$

where n and R are as defined above.

2. A process as claimed in claim 1, in which unsaturated prepolymers $A^1$ and $B^1$ are obtained by reacting unsaturated monoalcohol polyethers with structure E $$H_2C=CH-CH_2-R^1-OR^2-OH \quad (E)$$

with aliphatic, cycloaliphatic or aromatic diisocyanates having structure F $$OCN-R^3-NCO \quad (F)$$

with an NCO/OH ratio between 1.0 and 1.25, where $R^1$, $R^2$ and $R^3$ are as defined in claim 1.

3. A process as claimed in claim 1, in which the reaction between unsaturated monoalcohol polyethers E and diisocyanates F is carried out at a temperature between +60 and +150° C., preferably between +80 and +125° C.

4. A process as claimed in claim 2, in which the reaction between unsaturated monoalcohol polyethers E and diisocyanates F is carried out in the presence of a catalyst selected from tertiary amines, morpholines, cycloamidines or organometallic compounds of the elements in the 1st to 8th groups, preferably salts or complexes of aluminium, titanium, zirconium, zinc, tin, mercury, lead and bismuth.

5. A process as claimed in claim 4, in which the catalyst concentration ranges between $1\times10^{-3}$ and $500\times10^{-3}$ g/kg of reagent mixture, and preferably between $5\times10^{-3}$ and $100\times10^{-3}$ g/kg of reagent mixture.

6. A process as claimed in claim 4, in which the catalyst is an organic compound of tin or zinc or a mixture of the two, preferably tin octoate, tin dibutyl dilaurate, tin dibutyl acetyl acetonate, tin dibutyl maleate, zinc octoate and zinc naphthenate.

7. A process as claimed in claim 2, in which the reaction between unsaturated monoalcohol polyether E and diisocyanate F is performed in the presence of a solvent and/or plasticiser in the amount of 0–20% by weight.

8. A process as claimed in claim 2, in which the coupling reaction of unsaturated monoalcohol polyether E and diisocyanate F is carried out for 4–20 hours, preferably for 4–10 hours.

9. A process as claimed in claim 1, step (b), in which chlorosilanes C and orthoformates D are reacted in the mass of unsaturated prepolymers in accordance with the following stoichiometric ratios between chlorosilane C and the double bond of the unsaturated prepolymer ($r^1$) and between orthoformate and chlorosilane ($r^2$):

| | | |
|---|---|---|
| $r^1 =$ | 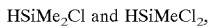 | $1 < r^1 \leq 10$ |
| $r^2 =$ |  | $(3-n) \leq r^2 \leq 1.2(3-n)$ | preferably $$1.1 \leq r^1 \leq 2.5$$

$$(3-n) \leq r^2 \leq 1.03(3-n)$$

where R and n are as defined above.

10. A process as claimed in claim 1, in which chlorosilane C is added to the mixture of unsaturated prepolymer and orthoformate at a temperature of less than +40° C., preferably less than +25° C.

11. A process as claimed in claim 1, in which chlorosilanes C suitable to generate alkoxysilane in situ are $$HSiMe_2Cl \text{ and } HSiMeCl_2,$$

preferably methyl dichlorosilane $$HSiMeCl_2,$$

and orthoformates D are methyl or ethyl orthoformate, preferably methyl orthoformate $$HC(OCH_3)_3$$

12. A process as claimed in claim 1, in which the silylation of unsaturated prepolymers $A^1$ or $A^1+B^1$ is performed with a catalyst selected from the class of organic, inorganic and organometallic compounds of platinum in the valency state between Pt(0) and Pt(IV), or organic, inorganic or organometallic compounds of rhodium, said catalyst preferably being chloroplatinic acid in the form of an alcoholic solution (Speyer catalyst).

13. A process as claimed in claim 12, in which the catalyst concentration is between $0.1\times10^{-3}$ and $10\times10^{-3}$ g/kg of mixture to be silylated, preferably between $1\times10^{-3}$ and $5\times10^{-3}$ g/kg.

14. A process as claimed in claim 1, in which the catalytic silylation of unsaturated prepolymers by means of alkoxysilanes generated in situ is carried out at temperatures of between +60 e +140° C., preferably between +80 and +105° C., for between 4 and 20 hours, preferably between 6 and 12 hours.

15. A process as claimed in claim 14, in which the silylation is carried out at pressures of up to 5 atmospheres, preferably at atmosphere pressure.

16. A process as claimed in claim 1, further including purification of by-products of the reaction and unreacted products by blowing with nitrogen or applying a vacuum at temperatures between +60 and +105° C.

17. A process as claimed in claim 1 for the preparation of fluid compositions which cross-link at ambient humidity through silicon-alkoxy groups, characterised by a viscosity of <500,000 mPa.sec at +23° C., preferably by a viscosity of between 5,000 and 50,000 mPa.sec at +23° C.

18. A process as claimed in claim 5, in which the catalyst is an organic compound of tin or zinc or a mixture of the two, preferably tin octoate, tin dibutyl dilaurate, tin dibutyl acetyl acetonate, tin dibutyl maleate, zinc octoate and zinc naphthenate.

* * * * *